| (12) | United States Patent | (10) Patent No.: | US 12,026,888 B2 |
|---|---|---|---|
| | Yamaguchi | (45) Date of Patent: | Jul. 2, 2024 |

(54) IMAGING ANALYZER

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 411 days.

(21) Appl. No.: 17/415,393

(22) PCT Filed: Feb. 14, 2019

(86) PCT No.: PCT/JP2019/005367
§ 371 (c)(1),
(2) Date: Jun. 17, 2021

(87) PCT Pub. No.: WO2020/166008
PCT Pub. Date: Aug. 20, 2020

(65) Prior Publication Data
US 2022/0044409 A1 Feb. 10, 2022

(51) Int. Cl.
*G06T 7/11* (2017.01)
*G06F 18/23* (2023.01)
(Continued)

(52) U.S. Cl.
CPC ................ *G06T 7/11* (2017.01); *G06F 18/23* (2023.01); *G06F 18/24* (2023.01);
(Continued)

(58) Field of Classification Search
CPC . G06T 7/11; G06T 2207/20104; G06F 18/23; G06F 18/24
See application file for complete search history.

(56) References Cited

U.S. PATENT DOCUMENTS

| 2014/0149412 A1* | 5/2014 | Nakamura | ............ G06F 16/355 |
|---|---|---|---|
| | | | 707/737 |
| 2015/0348767 A1* | 12/2015 | Makarov | ............. H01J 49/0004 |
| | | | 250/281 |
| 2019/0272984 A1 | 9/2019 | Takeshita | |

FOREIGN PATENT DOCUMENTS

| CN | 105321795 A | 2/2016 |
|---|---|---|
| DE | 10 2015 007 027 A1 | 12/2015 |

(Continued)

OTHER PUBLICATIONS

"SCiLS Lab 2D: Spatial segmentation with edge-preserving image denoising", SCiLS Application Note #3, Aug. 30, 2012, pp. 1-2, [online], Bruker, [searched on Dec. 2, 2018], Internet.

(Continued)

*Primary Examiner* — Myron Wyche
(74) *Attorney, Agent, or Firm* — Sughrue Mion, PLLC

(57) ABSTRACT

An imaging mass spectrometry unit (1) executes predetermined analysis on each of a plurality of micro areas set in a two-dimensional measurement region on a sample or a three-dimensional measurement region in a sample to acquire spectrum data. A clustering execution section (21) classifies spectrum data for a plurality of measurement points obtained for a reference sample into any of a plurality of clusters. A clustering model information storage section (22) stores a clustering model obtained by clustering processing. A segmentation execution section (23) classifies respective spectral data for a plurality of measurement points obtained for a sample other than a reference sample using a clustering model, and a spatial distribution image creation section (24) creates a segmentation image obtained by partitioning a two-dimensional or three-dimensional image into a plurality of small regions on the basis of a result of the classification.

8 Claims, 3 Drawing Sheets

(51) Int. Cl.
G06F 18/24 (2023.01)
H01J 49/00 (2006.01)
(52) U.S. Cl.
CPC  *H01J 49/0004* (2013.01); *G06T 2207/20104* (2013.01); *G06T 2207/30024* (2013.01)

(56) References Cited

FOREIGN PATENT DOCUMENTS

| | | |
|---|---|---|
| GB | 2534331 A | 7/2016 |
| JP | 2014-123341 A | 7/2014 |
| WO | 2018/037491 A1 | 3/2018 |

OTHER PUBLICATIONS

Bonnel, David, "Multivariate analyses for biomarkers hunting and validation through on-tissue bottom-up or in-source decay in MALDI-MSI: application to prostate cancer", Analytical and Bioanalytical Chemistry, Apr. 26, 2011, pp. 149-165, vol. 401, Iss. 1.
Kobarg, Jan Hendrik, "Signal and image processing methods for imaging mass spectrometry data", Aug. 2014, pp. 43-46.
International Search Report of PCT/JP2019/005367 dated Apr. 9, 2019 [PCT/ISA/210].
Written Opinion of PCT/JP2019/005367 dated Apr. 9, 2019 [PCT/ISA/237].

* cited by examiner

REFERENCE SAMPLE

ANOTHER SAMPLE

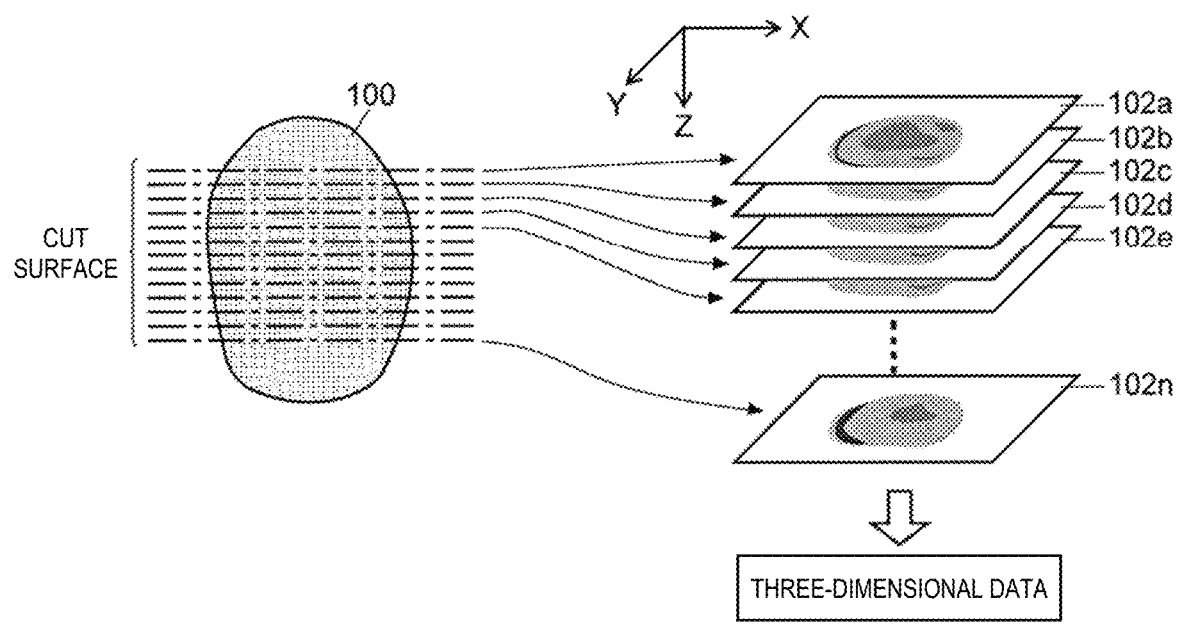

IMAGING ANALYZER

CROSS REFERENCE TO RELATED APPLICATIONS

This application is a National Stage of International Application No. PCT/JP2019/005367, filed Feb. 14, 2019.

TECHNICAL FIELD

The present invention relates to an imaging analyzer capable of collecting imaging data for creating a two-dimensional or three-dimensional image by executing analysis by various methods such as mass spectrometry, Raman spectroscopic analysis, infrared spectroscopic analysis, and fluorescence analysis for each of a large number of measurement points (micro areas) in a two-dimensional region on a sample or in a three-dimensional region in a sample.

BACKGROUND ART

In an imaging mass spectrometer, a two-dimensional intensity distribution of ions having a specific mass-to-charge ratio m/z on the surface of a sample such as a biological tissue section can be measured while observing the form of the surface of the sample with an optical microscope (see Patent Literature 1 and the like). In the imaging mass spectrometer, a mass spectrometry imaging graphic (hereinafter, referred to as an MS imaging graphic), which is a two-dimensional intensity distribution of ions at various mass-to-charge ratios, can be created for one sample.

As one analysis method in imaging mass spectrometry, processing is performed in which each measurement point is clustered by statistical analysis processing based on a mass spectrum pattern acquired for each measurement point, a region on a two-dimensional image is divided into a plurality of regions according to a result of the clustering, and the divided regions are color-coded and displayed (see Non Patent Literature 1). Such processing is generally called segmentation. Such processing requires a huge amount of calculation using a computer.

CITATION LIST

Patent Literature

Patent Literature 1: WO 2018/037491 A

Non Patent Literature

Non Patent Literature 1: "SCiLS Lab 2D: Spatial Segmentation with Edge—Pre-Serving Image Denoising (SCiLS Lab 2D: Spatial segmentation with edge-preserving image denoising)", [online], Bruker, [searched on Dec. 2, 2018], Internet

SUMMARY OF INVENTION

Technical Problem

According to the segmentation, it is possible to indicate regions having a high possibility of including the same component on the sample to an analyst in an easy-to-understand manner. However, in the conventional analysis method disclosed in Non Patent Literature 1 and the like, when there is a plurality of samples to be analyzed, and when segmentation is executed for each sample, the time required for the processing may be very long. In addition, comparison of results of segmentation among a plurality of different samples has not been taken into consideration so much, and thus it has been unsuitable for comparative analysis of a plurality of samples. Furthermore, in the conventional analysis method, it is not considered to use the result of segmentation of a certain sample for analysis of another sample, and the segmentation result is not necessarily effectively used.

There is a similar problem not only in imaging mass spectrometry but also in a case where imaging is performed using analysis by various methods such as Raman spectroscopic analysis, infrared spectroscopic analysis, and fluorescence analysis.

The present invention has been made to solve at least one of the above problems, and a main object of the present invention is to provide an imaging analyzer capable of shortening a time required to execute segmentation of an image based on imaging data obtained for each of a plurality of samples and capable of providing useful information on comparison between the samples to an analysis person.

Further, another object of the present invention is to provide an imaging analyzer capable of effectively using a segmentation result of an image based on imaging data obtained for a certain sample for analysis of another sample.

Solution to Problem

According to a first aspect of the present invention, there is provided an imaging analyzer capable of acquiring spectral data by executing predetermined analysis on each of a plurality of micro areas set in a two-dimensional measurement region on a sample or a three-dimensional measurement region in a sample, the imaging analyzer including:

a clustering execution section configured to execute clustering processing of classifying spectral data for a plurality of measurement points obtained for one sample into any of a plurality of clusters;

a model storage section configured to store a model of clustering obtained by clustering processing by the clustering execution section; and a segmentation execution section configured to classify spectral data for a plurality of measurement points obtained for an optional sample using a clustering model stored in the model storage section, and to create a segmentation image obtained by partitioning a two-dimensional or three-dimensional image into a plurality of small regions on the basis of a result of the classification.

Further, according to a second aspect of the present invention, there is provided an imaging analyzer capable of acquiring spectral data by executing predetermined analysis on each of a plurality of micro areas set in a two-dimensional measurement region on a sample or a three-dimensional measurement region in a sample, the imaging analyzer including:

a clustering execution section configured to execute clustering processing of classifying spectral data for a plurality of measurement points obtained for one sample into any of a plurality of clusters;

a segmentation image creation section configured to create a segmentation image obtained by partitioning the entire two-dimensional or three-dimensional measurement region or a part of the entire two-dimensional or three-dimensional measurement region into a plurality of small regions on the basis of a result of the clustering processing; and a region-of-interest designation accepting section that displays the segmentation image on a display unit and recognizes one or a plurality of partitioned small regions in the segmentation image as a region of interest according to an operation of an input unit by a user.

Advantageous Effects of Invention

According to the imaging analyzer of the first aspect of the present invention, it is possible to shorten the time required to execute segmentation of an image based on imaging data obtained for each of a plurality of samples. In addition, according to the imaging analyzer of the first aspect of the present invention, for each of a plurality of samples, a segmentation image that is a result of clustering a plurality of pieces of spectral data for each sample under the same standard is obtained, so that it is possible to provide a user with useful information on comparison between the plurality of samples.

In addition, according to the imaging analyzer of the second aspect of the present invention, a segmentation result of an image based on imaging data obtained for a certain sample can be effectively used for analysis of another sample. As a result, for example, it is possible to designate a more appropriate region as an analysis target, such as a region having a high possibility of containing a predetermined component in the sample or a region having a high possibility of being the same biological tissue, as the region of interest.

BRIEF DESCRIPTION OF DRAWINGS

FIGS. 5A and 5B are explanatory diagrams in the case of analyzing a three-dimensional region using the imaging mass spectrometer of the present embodiment.

DESCRIPTION OF EMBODIMENTS

Hereinafter, an imaging mass spectrometer that is an embodiment of an imaging analyzer according to the present invention will be described with reference to the accompanying drawings.

<Configuration of Device of Present Embodiment>

Figure 1:
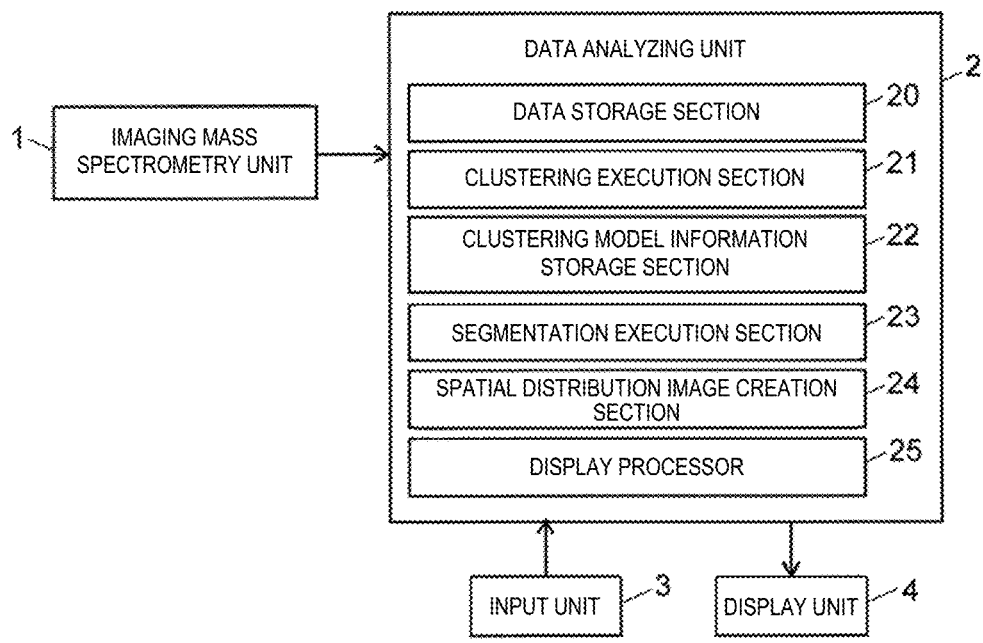
FIG. 1 is a schematic configuration diagram of an imaging mass spectrometer according to an embodiment of the present invention.

FIG. 1 is a schematic block configuration diagram of the imaging mass spectrometer of the present embodiment.

The imaging mass spectrometer of the present embodiment includes an imaging mass spectrometry unit 1, a data analyzing unit 2, an input unit 3, and a display unit 4.

The imaging mass spectrometry unit 1 executes imaging mass spectrometry on a sample, and is a mass spectrometer obtained by combining an atmospheric pressure matrix-assisted laser desorption ionization (AP-MALDI) method for irradiating the sample with laser light under an atmospheric pressure atmosphere to ionize a substance in the sample and an ion-trap time-of-flight mass spectrometer (IT-TOFMS), for example, as disclosed in Patent Literature 1 and the like. In the imaging mass spectrometry unit 1, for example, by scanning a position irradiated with laser light for ionization in a two-dimensional region on the sample such as a biological tissue section, mass spectrometry is performed for each of a large number of measurement points (substantially micro areas) in the two-dimensional region, and mass spectrum data over a predetermined mass-to-charge ratio range can be acquired.

The data analyzing unit 2 receives the mass spectrum data for each of the large number of measurement points (micro areas) obtained by the imaging mass spectrometry unit 1, and performs analysis processing based on the data. The data analyzing unit 2 includes a data storage section 20, a clustering execution section 21, a clustering model information storage section 22, a segmentation execution section 23, a spatial distribution image creation section 24, and a display processor 25 as functional blocks in order to perform characteristic analysis processing described later.

Although the data analyzing unit 2 can be configured by a hardware circuit, the data analyzing unit 2 is generally a computer such as a personal computer or a high-performance workstation. Each of the functional blocks can be embodied by executing dedicated data analysis software installed in the computer on the computer. In this case, the input unit 3 is a keyboard or a pointing device (such as a mouse) attached to the computer, and the display unit 4 is a display monitor.

<Processing Operation in Device of Present Embodiment>

Next, an example of characteristic processing operation in the imaging mass spectrometer of the present embodiment will be described with reference to FIG. 2.

The imaging mass spectrometry unit 1 executes scan measurement over a predetermined mass-to-charge ratio m/z range for each of a large number of measurement points set in a measurement region having a predetermined size on the sample such as a biological tissue section to acquire mass spectrum data. The obtained data is transferred from the imaging mass spectrometry unit 1 to the data analyzing unit 2 and stored in the data storage section 20. The imaging mass spectrometry unit 1 collects mass spectrum data for a large number of measurement points for each of a large number of samples collected from a large number of specimens, and the data storage section 20 stores a large number of pieces of mass spectrum data for each sample. Here, the large number of samples are, for example, samples collected from the same biological tissue of different specimens.

When a user performs a predetermined operation on the input unit 3 in a state where the above-described data (a large number of pieces of mass spectrum data for each sample) is stored in the data storage section 20, the data analyzing unit 2 executes the following analysis processing using the data stored in the data storage section 20 as described above.

The clustering execution section 21 reads data for one sample designated as a reference sample by the user from the data storage section 20. Then, clustering processing based on similarity of spectrum patterns (relative ratios of peak intensities at a plurality of mass-to-charge ratios) of the mass spectrum is executed on the read mass spectrum data of each measurement point.

Various statistical analysis methods and algorithms are known for clustering processing. The clustering can be roughly classified into hierarchical clustering and non-hierarchical clustering, and the hierarchical clustering includes algorithms such as a shortest distance method (single connection method), a longest distance method (full connection method), a group average method, and Ward's method. On the other hand, in the non-hierarchical clustering, a k-means method or the like is common. The type of the clustering algorithm used here is not particularly limited, but all the measurement points (or all the mass spectra corresponding to the measurement points) finally belong to any of the plurality of clusters regardless of which algorithm is used. In other words, the clustering is unsupervised machine learning.

Figure 2:
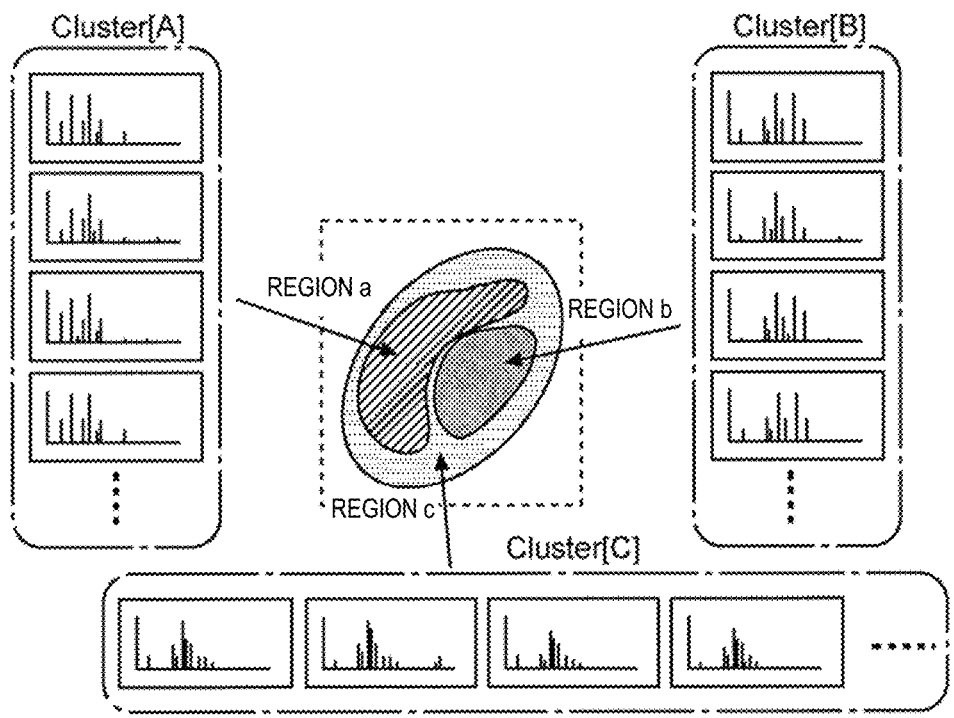
FIG. 2 is an explanatory diagram of an example of analysis processing in the imaging mass spectrometer of the present embodiment.

By the clustering processing, the mass spectrum (data constituting the mass spectrum) corresponding to each measurement point is classified into any of a plurality of clusters as illustrated in FIG. 2. In FIG. 2, there are three clusters, specifically, Cluster [A], Cluster [B], and Cluster [C], but the number of clusters is not limited thereto. As is well known, in the clustering processing, there are a case where the number of clusters is automatically determined by the algorithm and a case where the number of clusters is designated from the outside. The clustering execution section 21 classifies mass spectra corresponding to a large number of measurement points in a given sample into any of a plurality of clusters by executing clustering processing, and creates a model for the classification. This model is, for example, a learning model constructed by the above-described unsupervised machine learning. The clustering model information storage section 22 stores information constituting the created model.

In the clustering based on the similarity of mass spectra, there is a high possibility that the same component is included as a main component at measurement points at which mass spectra belonging to the same cluster are obtained. Alternatively, there is a high possibility that the measurement points at which the mass spectra belonging to the same cluster are obtained are the same tissue in the living body even when distinguishment is difficult apparently. Therefore, the segmentation execution section 23 reads the mass spectrum data obtained for another sample other than the reference sample from the data storage section 20, and classifies the measurement points into any of the plurality of clusters using the model stored in the clustering model information storage section 22 for each sample. Here, since the existing model is only used to classify the mass spectrum data into any cluster whose spectrum pattern is estimated to be the most similar, the processing is performed very quickly.

For a sample for which classification of measurement points into a plurality of clusters has been completed, the spatial distribution image creation section 24 creates a spatial distribution image in which small regions, which are a set of measurement points corresponding to each cluster, are displayed in different colors according to cluster classification of each measurement point. The different display colors for each cluster may be determined by default, and may be changed by the user as necessary. The spatial distribution image is, for example, a segmentation image in which regions including the same component as a main component have the same color and regions including different components as main components are represented by different colors. The display processor 25 displays the segmentation image created by the spatial distribution image creation section 24 on the screen of the display unit 4. For example, in the example of FIG. 2, a segmentation image in which regions a, b, and c are color-coded corresponding to Cluster [A], Cluster [B], and Cluster [C], respectively, is created and displayed.

As described above, in the imaging mass spectrometer of the present embodiment, mass spectrum data obtained for a plurality of samples is classified into a plurality of pieces under the same standard, and a segmentation image according to the classification is created and displayed. Therefore, the segmentation images for a plurality of samples can be compared as they are. In addition, as described above, the mass spectrum data may be classified into clusters using the created cluster model other than when the cluster model is created based on the mass spectrum data of the reference sample, so that the processing can be performed at high speed. Therefore, segmentation images for a plurality of samples can be created in a relatively short time.

<Configuration of Device of Another Embodiment>

Next, an imaging mass spectrometer according to another embodiment will be described with reference to FIG. 3 and FIGS. 4A and 4B.

Figure 3:
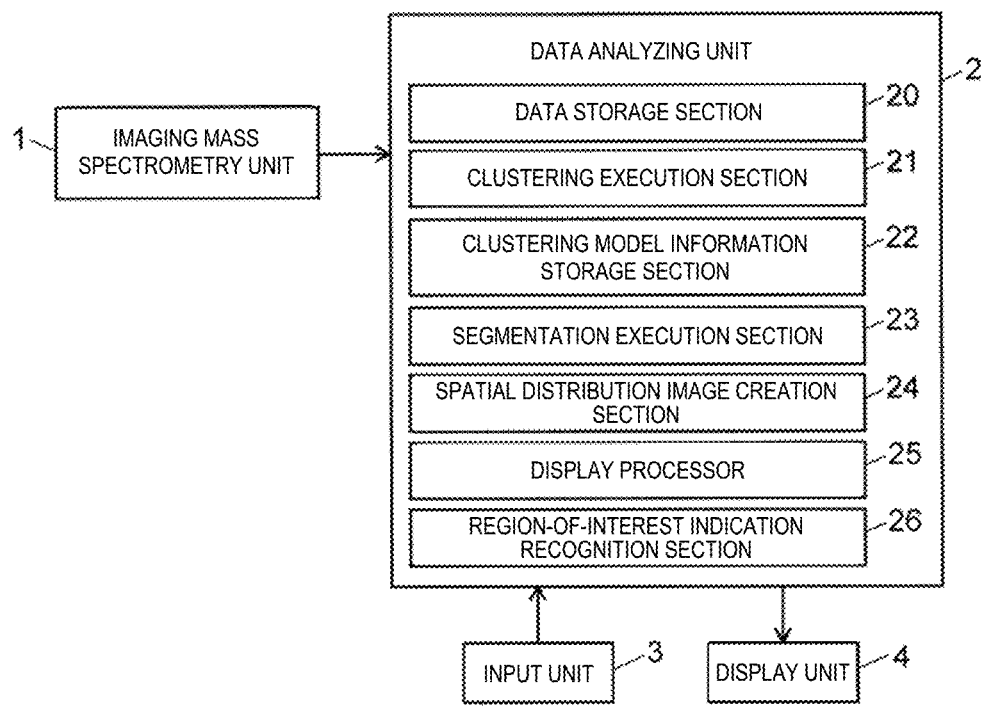
FIG. 3 is a schematic configuration diagram of an imaging mass spectrometer according to another embodiment of the present invention.

FIG. 3 is a schematic block configuration diagram of the imaging mass spectrometer according to another embodiment. The same or corresponding components as those of the device of the above embodiment are denoted by the same reference numerals. In the imaging mass spectrometer of this embodiment, a region-of-interest indication recognition section 26 is added to the data analyzing unit 2 as a new functional block.

<Processing Operation in Device of Another Embodiment>

Next, an example of characteristic processing operation in the imaging mass spectrometer of this embodiment will be described with reference to FIGS. 4A and 4B.

The device is the same as the device of the above embodiment until clustering processing is executed based on mass spectrum data of each measurement point for a reference sample collected by the imaging mass spectrometry unit 1 and stored in the data storage section 20, and the measurement point (mass spectrum corresponding to the measurement point) is classified into any of a plurality of clusters.

When the classification of the measurement points on the reference sample into a plurality of clusters is completed, the spatial distribution image creation section 24 creates a spatial distribution image in which small regions, which are a set of measurement points corresponding to each cluster, are displayed in different colors, that is, a segmentation image, according to the cluster classification of each measurement point. The display processor 25 displays the segmentation image of the reference sample on the screen of the display unit 4. As a result, for example, a segmentation image as illustrated in FIG. 4A is displayed.

The user determines a region of interest to be analyzed in detail or to be compared among a plurality of samples, for example, by viewing the image, and instructs the region on the displayed segmentation image by clicking the region with a mouse (input unit 3) or the like. Then, the region-of-interest indication recognition section 26 recognizes the indicated region, that is, one segmented region, and stores the range occupied by the region as the region of interest. In the example of FIG. 4A, when the region b on the image is clicked, the region b is stored as the region of interest.

Figure 4A:
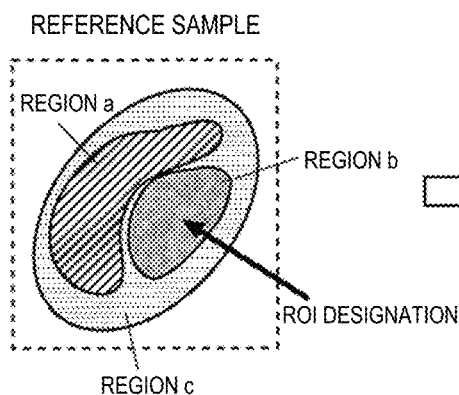
FIGS. 4A and 4B are explanatory diagrams of an example of analysis processing in the imaging mass spectrometer of another embodiment.

In FIG. 4A, the region b is gathered into one, but since this region is a set of measurement points (pixels) belonging to the same cluster, the region is not necessarily gathered into one, and may be dispersed into a plurality of regions, for example. However, even in such a case, when one of the plurality of distributed regions is designated, other regions configured by measurement points belonging to the same cluster as the measurement points included in the region are also stored together as the region of interest.

In general, an imaging mass spectrometer often measures or analyzes only a region of interest designated by a user. Similarly, the region of interest designated as described above can also be used as a target region for selectively performing or analyzing the measurement. For example, limited to the region of interest designated as described above, MS/MS analysis in which precursor ions having a specific mass-to-charge ratio are set can be executed for each measurement point in the region of interest to acquire an MS/MS spectrum.

In addition, when a plurality of samples are compared, the following analysis can be executed.

Similarly to the device of the above embodiment, the segmentation execution section 23 reads the mass spectrum data obtained for another sample other than the reference sample from the data storage section 20, and classifies the measurement points into any of the plurality of clusters using the model stored in the clustering model information storage section 22 for each sample. The spatial distribution image creation section 24 creates a segmentation image according to the cluster classification of each measurement point, and at that time, creates a segmentation image in which only a small region, which is a set of measurement points corresponding to a cluster designated as a region of interest, is emphasized.

Figure 4B:
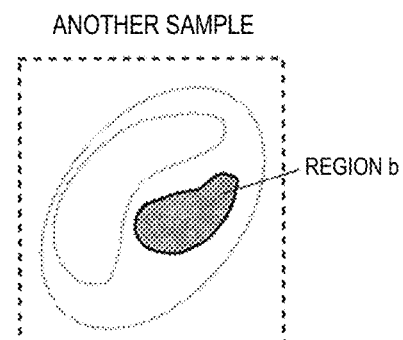

This may be, for example, an image in which only a small region, which is a set of measurement points corresponding to a cluster designated as a region of interest, is colored as illustrated in FIG. 4B, or in a normal segmentation image, only a small region, which is a set of measurement points corresponding to a cluster designated as a region of interest, may be brightened while the others may be displayed darkly.

With such display, for example, it is easy to compare the spread situation of the region containing a large amount of the same component among a plurality of samples.

<Other Modifications>

In the device of the above embodiment, the measurement region on the sample is two-dimensional, but the device according to the present invention can also be used in a case where the measurement region is three-dimensional.

FIGS. 5A and 5B are conceptual diagrams of a three-dimensional mass spectrometry imaging graphic. For example, as illustrated in FIG. 5A, a sample 100 such as a small piece of an organ cut out from a living body is sliced very thinly and continuously to prepare a large number of sample slices. Here, the cut surfaces of the sample slices are parallel to the X-Y plane. The imaging mass spectrometry unit 1 measures the inside of a two-dimensional measurement region on each sample slice. As a result, as illustrated in FIG. 5B, mass spectrum data of each measurement point at which an MS imaging graphic corresponding to each sample slice can be formed is obtained. By arranging the data in the Z-axis direction with the positions on the X-axis and the Y-axis aligned, it is possible to obtain data that can form a substantially three-dimensional MS imaging graphic. That is, this data is mass spectrum data at each of the measurement points arranged in the three axis directions of X, Y, and Z.

A three-dimensional segmentation image can be created by performing clustering processing on the similarity of the spectrum patterns of the mass spectra on this data as described above and executing three-dimensional segmentation. In addition, by making it possible to designate an optional region on the three-dimensional segmentation image displayed on the display unit, it is also possible to designate a three-dimensional region of interest.

The devices of the above embodiments are all imaging mass spectrometers, but the present invention can be applied to imaging analyzers using various analysis methods other than mass spectrometry imaging.

For example, in an infrared (IR) imaging method or a Raman imaging method, an absorption spectrum or a Raman spectroscopic spectrum in a predetermined wavelength range can be obtained for each of a large number of measurement points on a sample, and an imaging graphic indicating a two-dimensional distribution of intensity of a specific wavelength can be created based on data obtained by the absorption spectrum or the Raman spectroscopic spectrum. In the X-ray spectroscopic imaging method, a spectroscopic spectrum in a predetermined wavelength (energy) range can be obtained for each of a large number of measurement points on a sample, and an imaging graphic indicating a two-dimensional distribution of intensity of a specific wavelength can be created based on data obtained by the spectroscopic spectrum. In any case, since spectrum data is obtained for each of a large number of measurement points in the measurement region, data analysis using the above-described method is possible.

In addition, the above embodiments and modifications are merely examples of the present invention, and it is a matter of course that modifications, corrections, additions, and the like appropriately made within the scope of the gist of the present invention are included in the claims of the present application.

Various embodiments of the present invention have been described above with reference to the drawings. Finally, various aspects of the present invention will be described.

According to a first aspect of the present invention, there is provided an imaging analyzer capable of acquiring spectral data by executing predetermined analysis on each of a plurality of micro areas set in a two-dimensional measurement region on a sample or a three-dimensional measurement region in a sample, the imaging analyzer including:
    a clustering execution section configured to execute clustering processing of classifying spectral data for a plurality of measurement points obtained for one sample into any of a plurality of clusters;
    a model storage section configured to store a model of clustering obtained by clustering processing by the clustering execution section; and
    a segmentation execution section configured to classify spectral data for a plurality of measurement points obtained for an optional sample using a clustering model stored in the model storage section, and to create a segmentation image obtained by partitioning a two-dimensional or three-dimensional image into a plurality of small regions on the basis of a result of the classification.

In the imaging analyzer of the first aspect, segmentation for another sample can be executed using a clustering model obtained for a certain sample. Therefore, according to the imaging analyzer of the first aspect, it is possible to shorten the time required to execute segmentation of an image based on imaging data obtained for each of a plurality of samples, and to efficiently perform comparative analysis of the plurality of samples. In addition, according to the imaging analyzer of the first aspect, for a plurality of samples, a segmentation image that is a result of clustering a plurality of pieces of spectral data for each sample under the same standard is obtained, so that it is possible to provide a user with useful information on comparison between the plurality of samples.

According to a second aspect of the present invention, there is provided an imaging analyzer capable of acquiring spectral data by executing predetermined analysis on each of a plurality of micro areas set in a two-dimensional measurement region on a sample or a three-dimensional measurement region in a sample, the imaging analyzer including:

a clustering execution section configured to execute clustering processing of classifying spectral data for a plurality of measurement points obtained for one sample into any of a plurality of clusters;

a segmentation image creation section configured to create a segmentation image obtained by partitioning the entire two-dimensional or three-dimensional measurement region or a part of the entire two-dimensional or three-dimensional measurement region into a plurality of small regions on the basis of a result of the clustering processing; and a region-of-interest designation accepting section that displays the segmentation image on a display unit and recognizes one or a plurality of partitioned small regions in the segmentation image as a region of interest according to an operation of an input unit by a user.

According to the imaging analyzer of the second aspect, a segmentation result of an image based on imaging data obtained for a certain sample can be effectively used for analysis of another sample. As a result, for example, it is possible to designate a more appropriate region as an analysis target, such as a region having a high possibility of containing a predetermined component in the sample or a region having a high possibility of being the same biological tissue, as the region of interest.

In the imaging analyzer of a third aspect of the present invention, in the imaging analyzer of the first or second aspect, the measurement region is a two-dimensional measurement region on a sample.

According to the imaging analyzer of the third aspect, for example, for a thin sample such as a biological tissue slice, it is easy to compare distribution situations of the same component among a plurality of samples.

In the imaging analyzer of a fourth aspect of the present invention, in the imaging analyzer of the first or second aspect, the measurement region is a three-dimensional measurement region in a sample.

According to the imaging analyzer of the fourth aspect, for example, for a thick sample such as a biological tissue section, it is easy to compare distribution situations of the same component among a plurality of samples.

In the imaging analyzer of a fifth aspect of the present invention, in the imaging analyzer of the first or second aspect, the predetermined analysis is mass spectrometry, and the spectrum data is mass spectrum data The mass spectrometry herein includes MS/MS analysis and $MS^n$ analysis (where n is an integer of 3 or more) accompanied by an operation of dissociating ions derived from sample components.

According to the imaging analyzer of the fifth aspect, since mass spectrometry having high separability of different types of components is used as an analysis method, it is possible to compare distribution situations of the same component among a plurality of samples with high accuracy.

REFERENCE SIGNS LIST

1 . . . Imaging Mass Spectrometry Unit
2 . . . Data Analyzing Unit
20 . . . Data Storage Section
21 . . . Clustering Execution Section
22 . . . Clustering Model Information Storage Section
23 . . . Segmentation Execution Section
24 . . . Spatial Distribution Image Creation Section
25 . . . Display Processor
26 . . . Region-of-interest Indication Recognition Section
3 . . . Input Unit
4 . . . Display Unit

The invention claimed is:

1. An imaging analyzer capable of acquiring spectral data by executing predetermined analysis on each of a plurality of micro areas set in a two-dimensional measurement region on a sample or a three-dimensional measurement region in a sample, the imaging analyzer comprising:

a clustering execution section configured to execute clustering processing of classifying spectral data for a plurality of measurement points obtained for one sample into any of a plurality of clusters;

a model storage section configured to store a model of clustering obtained by clustering processing by the clustering execution section; and a segmentation execution section configured to classify spectral data for a plurality of measurement points obtained for an optional sample using a clustering model stored in the model storage section, and to create a segmentation image obtained by partitioning a two-dimensional or three-dimensional image into a plurality of small regions on the basis of a result of the classification.

2. An imaging analyzer capable of acquiring spectral data by executing predetermined analysis on each of a plurality of micro areas set in a two-dimensional measurement region on a sample or a three-dimensional measurement region in a sample, the imaging analyzer comprising:

a clustering execution section configured to execute clustering processing of classifying spectral data for a plurality of measurement points obtained for one sample into any of a plurality of clusters;

a segmentation image creation section configured to create a segmentation image obtained by partitioning the entire two-dimensional or three-dimensional measurement region or a part of the entire two-dimensional or three-dimensional measurement region into a plurality of small regions on the basis of a result of the clustering processing; and a region-of-interest designation accepting section that displays the segmentation image on a display unit and recognizes one or a plurality of partitioned small regions in the segmentation image as a region of interest according to an operation of an input unit by a user.

3. The imaging analyzer according to claim 1, wherein the measurement region is a two-dimensional measurement region on a sample.

4. The imaging analyzer according to claim 1, wherein the measurement region is a three-dimensional measurement region in a sample.

5. The imaging analyzer according to claim 1, wherein the predetermined analysis is mass spectrometry, and the spectrum data is mass spectrum data.

6. The imaging analyzer according to claim 2, wherein the measurement region is a two-dimensional measurement region on a sample.

7. The imaging analyzer according to claim 2, wherein the measurement region is a three-dimensional measurement region in a sample.

8. The imaging analyzer according to claim 2, wherein the predetermined analysis is mass spectrometry, and the spectrum data is mass spectrum data.

\* \* \* \* \*